(12) United States Patent
Lin et al.

(10) Patent No.: US 10,737,581 B2
(45) Date of Patent: Aug. 11, 2020

(54) ADAPTIVE POWER SUPPLY SYSTEM AND OPERATION METHOD THEREOF

(71) Applicant: Industrial Technology Research Institute, Hsinchu (TW)

(72) Inventors: Chien-Hung Lin, Hsinchu County (TW); Yu-Sheng Lee, Kaohsiung (TW); Chih-Wei Hsu, Hsinchu (TW); Yung-Chao Chen, Taichung (TW); Hsien-Ching Hsieh, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 7 days.

(21) Appl. No.: 16/215,642

(22) Filed: Dec. 11, 2018

(65) Prior Publication Data

US 2019/0366860 A1 Dec. 5, 2019

Related U.S. Application Data

(60) Provisional application No. 62/679,985, filed on Jun. 4, 2018.

(30) Foreign Application Priority Data

Nov. 20, 2018 (TW) .............................. 107141187 A

(51) Int. Cl.
*B60L 53/18* (2019.01)
*H02J 7/00* (2006.01)
(Continued)

(52) U.S. Cl.
CPC ............ *B60L 53/18* (2019.02); *B64C 39/022* (2013.01); *B64C 39/024* (2013.01); *B64F 1/362* (2013.01);
(Continued)

(58) Field of Classification Search
CPC .... B60L 53/18; B60L 2200/10; B64C 39/022; B64C 39/024; B64C 2201/042;
(Continued)

(56) References Cited

U.S. PATENT DOCUMENTS 3,481,584 A * 12/1969 Robertson ................ B66D 1/08
254/268
7,149,611 B2 12/2006 Beck et al.
(Continued)

FOREIGN PATENT DOCUMENTS

CN 103019262 4/2013
CN 105109703 12/2015
(Continued)

OTHER PUBLICATIONS

Xuesu Xiao, et al., "Visual Servoing for Teleoperation Using a Tethered UAV," 2017 IEEE International Symposium on Safety, Security and Rescue Robotics (SSRR), Oct. 2017, pp. 147-152.
(Continued)

*Primary Examiner* — Robert L Deberadinis
(74) *Attorney, Agent, or Firm* — JCIPRNET

(57) ABSTRACT

An adaptive power supply system for an unmanned vehicle and an operation method thereof are provided. The adaptive power supply system includes an adaptive power supply, a battery, a sensing circuit, and a power dispatch controller. The output terminal of the adaptive power supply powers the load circuit of the unmanned vehicle. The battery is coupled to the output terminal of the adaptive power supply. The sensing circuit senses the output of the output terminal of the adaptive power supply and the output of the battery. The power dispatch controller controls the output of the output terminal of the adaptive power supply according to the sensing result of the sensing circuit. The power dispatch controller determines whether one or both of the adaptive
(Continued)

power supply and the battery power the load circuit by adjusting the output of the adaptive power supply.

26 Claims, 7 Drawing Sheets

(51) Int. Cl.
*B64C 39/02* (2006.01)
*B65H 59/38* (2006.01)
*B64F 1/36* (2017.01)

(52) U.S. Cl.
CPC .......... *B65H 59/384* (2013.01); *H02J 7/0068* (2013.01); *B60L 2200/10* (2013.01); *B64C 2201/042* (2013.01); *B65H 2701/34* (2013.01)

(58) Field of Classification Search
CPC . B64C 39/02; B64F 1/362; B64F 1/36; B65H 59/384; B65H 2701/34; B65H 59/38; H02J 7/0068; H02J 7/00
See application file for complete search history.

(56) References Cited

U.S. PATENT DOCUMENTS

| | | |
|---|---|---|
| 9,751,626 B2 | 9/2017 | Phan et al. |
| 2005/0151517 A1* | 7/2005 | Cook ................ H02J 1/102 323/207 |
| 2011/0180667 A1 | 7/2011 | O'Brien et al. |
| 2013/0233964 A1 | 9/2013 | Woodworth et al. |
| 2016/0200437 A1 | 7/2016 | Ryan et al. |
| 2016/0318607 A1 | 11/2016 | Desai et al. |

FOREIGN PATENT DOCUMENTS

| | | |
|---|---|---|
| CN | 205952334 | 2/2017 |
| CN | 206164092 | 5/2017 |
| CN | 206807060 | 12/2017 |
| KR | 101350291 | 1/2014 |
| TW | 200800431 | 1/2008 |
| TW | M522458 | 5/2016 |
| TW | 201626683 | 7/2016 |
| TW | 201742789 | 12/2017 |

OTHER PUBLICATIONS

Tarek M. Mostafa, et al., "Wireless Battery Charging System for Drones via Capacitive Power Transfer," 2017 IEEE PELS Workshop on Emerging Technologies: Wireless Power Transfer (WoW), May 2017, pp. 1-6.

P. G. Sudheesh, et al., "Sum-Rate Analysis for High Altitude Platform (HAP) Drones With Tethered Balloon Relay," IEEE Communications Letters, vol. 22, Dec. 2017, pp. 1240-1243.

Alexander Williams, et al., "Persistent Mobile Aerial Surveillance Platform using Intelligent Battery Health Management and Drone Swapping," 2018 4th International Conference on Control, Automation and Robotics, Apr. 2018, pp. 237-246.

Lorenzo Manzoli, et al., "A Boat-Based Flying Drone to Monitor Coastlines and Render Them in Augmented Reality," 2017 International Symposium ELMAR, Sep. 2017, pp. 283-286.

Cristina Gabriela Sărăcin, et al., "Powering Aerial Surveillance Drones," The 10th International Symposium on Advanced Topics in Electrical Engineering, Mar. 2017, pp. 237-240.

"Office Action of Taiwan Counterpart Application," dated Jul. 24, 2019, p. 1-p. 13.

* cited by examiner

ADAPTIVE POWER SUPPLY SYSTEM AND OPERATION METHOD THEREOF

CROSS-REFERENCE TO RELATED APPLICATION

This application claims the priority benefits of U.S. provisional application Ser. No. 62/679,985, filed on Jun. 4, 2018 and Taiwan application serial no. 107141187, filed on Nov. 20, 2018. The entirety of each of the above-mentioned patent applications is hereby incorporated by reference herein and made a part of this specification.

TECHNICAL FIELD

The disclosure relates to an adaptive power supply system and an operation method thereof.

BACKGROUND

The power source of a typical drone is a battery. The flight time of the drone depends on the capacity of the battery. However, the capacity of the battery is limited, and when the drone requires a longer flight time, the battery may have difficulty providing sufficient power. To extend the flight time of the drone, a tethered drone is another option. A ground device may provide power to the tethered drone through a power cable, and therefore the flight time of the tethered drone may be significantly extended.

SUMMARY

The disclosure provides an adaptive power supply system and an operation method thereof to effectively reduce the wire loss of a cable.

An embodiment of the disclosure provides an adaptive power supply system for an unmanned vehicle. The adaptive power supply system includes an adaptive power supply, a battery, a sensing circuit, and a power dispatch controller. The adaptive power supply disposed in the unmanned vehicle receives source power. The output terminal of the adaptive power supply powers the load circuit of the unmanned vehicle. The battery disposed in the unmanned vehicle is coupled to the output terminal of the adaptive power supply. The sensing circuit is coupled to the output terminal of the adaptive power supply to sense the output of the adaptive power supply. The sensing circuit is coupled to the battery to sense the output of the battery. The power dispatch controller is coupled to the sensing circuit and the adaptive power supply. The power dispatch controller controls the output of the output terminal of the adaptive power supply according to the sensing result of the sensing circuit. The power dispatch controller determines, by adjusting the output of the adaptive power supply, whether the adaptive power supply powers the load circuit, the battery powers the load circuit, or the battery and the adaptive power supply power the load circuit together.

An embodiment of the disclosure provides an operation method of an adaptive power supply system for an unmanned vehicle. The operation method includes the following steps. Source power is received by an adaptive power supply disposed in an unmanned vehicle. The load circuit of the unmanned vehicle is powered by the output terminal of the adaptive power supply. The output of the output terminal of the adaptive power supply is sensed by the sensing circuit. The output of the battery disposed in the unmanned vehicle is sensed by the sensing circuit, wherein the battery is coupled to the output terminal of the adaptive power supply. The output of the output terminal of the adaptive power supply is controlled by the power dispatch controller according to the sensing result of the sensing circuit. In particular, the power dispatch controller determines, by adjusting the output of the adaptive power supply, whether the adaptive power supply powers the load circuit, the battery powers the load circuit, or the battery and the adaptive power supply power the load circuit together.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
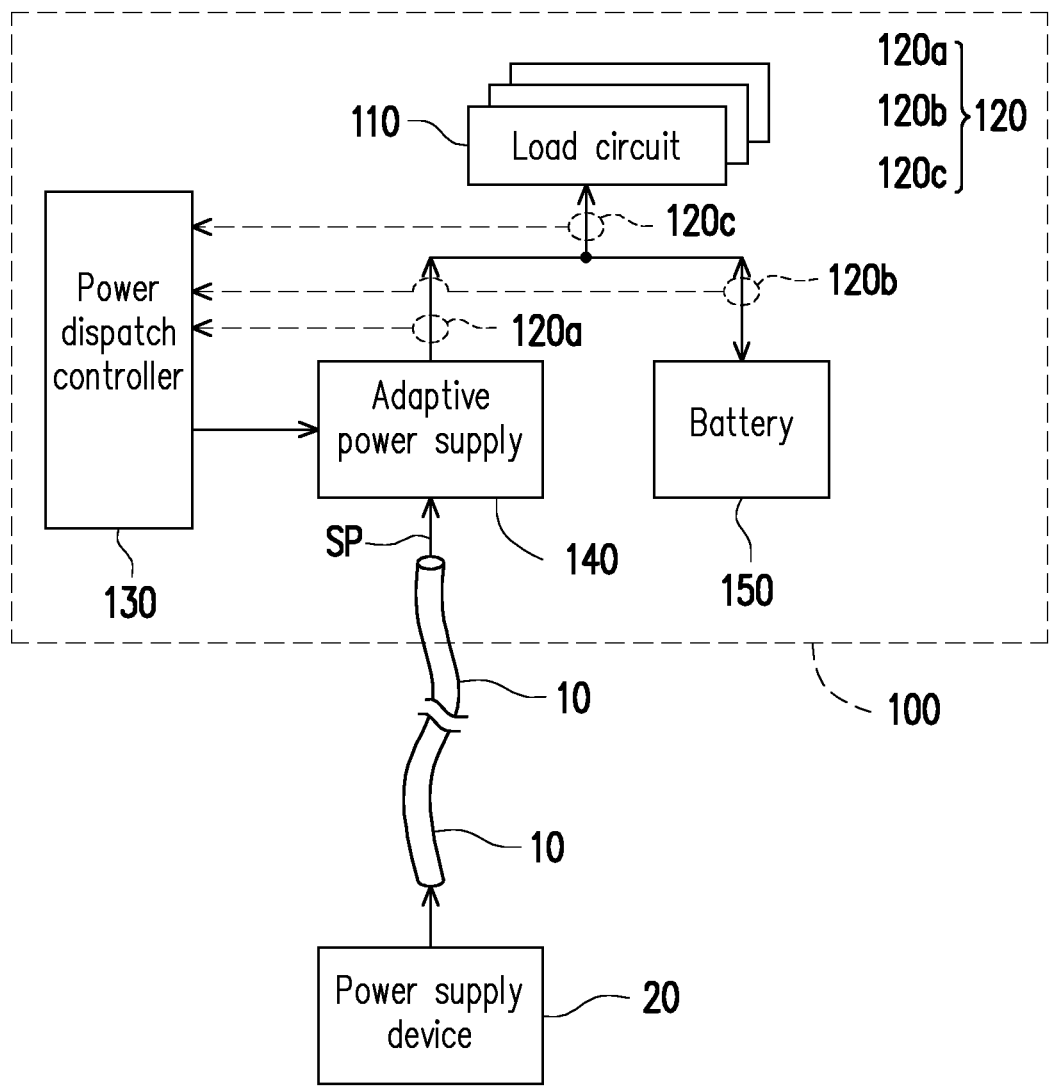
FIG. 1 is a circuit block diagram of an adaptive power supply system shown according to an embodiment of the disclosure.

The term "coupled to (or connected to)" used in the entire text of the specification of the present application (including claims) may refer to any direct or indirect connecting means. For instance, if the text describes a first device is coupled to (or connected to) a second device, then it should be understood that the first device may be directly connected to the second device, or the first device may be indirectly connected to the second device through other devices or certain connecting means. Moreover, when applicable, devices/components/steps having the same reference numerals in figures and embodiments represent the same or similar parts. Elements/components/steps having the same reference numerals or having the same terminology in different embodiments may be cross-referenced.

In some embodiments, inside of the tethered drone is not provided with a power supply. The required power of the fly control system, electric speed control (ESD) circuit, motor, and other load circuits/elements of the tethered drone is provided directly by the power cable. Therefore, a ground device provides direct current (DC) power to the tethered drone through a power cable. A longer power cable has longer parasitic resistance. For example, if the resistance value of a 100-meter power cable is 15 ohms and the power and voltage required for the tethered drone are respectively 600 watts and 24 volts, then the current of the DC power transmitted by the power cable is 600/24=25 amps, resulting in a voltage drop of 15*25=375 volts for the power cable. Therefore, the voltage required by the ground device to supply DC power to the power cable is 375+24=399 volts. As a result, the wire loss of the power cable is 375*25=9375 watts. This is a considerable wire loss.

Moreover, if the ground device does not perform tension control on the power cable, the power cable may be entangled (knotted).

FIG. 1 is a circuit block diagram of an adaptive power supply system shown according to an embodiment of the disclosure. The adaptive power supply system shown in FIG. 1 is suitable for an unmanned vehicle 100. Based on design requirements, the unmanned vehicle 100 is, for example, a drone, an unmanned vehicle, a robot, or other electromechanical devices. The drone may be a tethered drone or other types of drones. The unmanned vehicle 100 is provided with the adaptive power supply system shown in FIG. 1 and other elements. In the case of the drone, the unmanned vehicle may also be provided with a motor, a fly control system, an electric speed control (ESD) circuit, and/or other elements. Depending on the design requirements, the motor may drive a mechanical energy mechanism of the unmanned vehicle, such as a propeller, a wheel, a mechanical foot, or other mechanisms.

The adaptive power supply system shown in FIG. 1 includes a load circuit 110, a sensing circuit 120, a power dispatch controller 130, an adaptive power supply 140, and a battery 150. In the embodiment shown in FIG. 1, the load circuit 110, the sensing circuit 120, the power dispatch controller 130, the adaptive power supply 140, and the battery 150 are disposed in the unmanned vehicle 100. The load circuit 110 may include a motor, a flight control system, an ESD circuit, and/or other electrical elements, depending on design requirements.

A first end of the cable 10 is coupled to an input terminal of the adaptive power supply 140. A second end of the cable 10 is coupled to an output terminal of a power supply device 20. In an embodiment, the cable 10 includes a power cable, and the power supply device 20 may provide source power SP to the adaptive power supply 140 through the cable 10. For example, in some embodiments, the power supply device 20 may provide an alternating current (AC) high-voltage power (the source power SP) to the unmanned vehicle 100 through the cable 10. In some other embodiments, the power supply device 20 may provide a direct current (DC) high-voltage power (the source power SP) to the unmanned vehicle 100 through the cable 10. The adaptive power supply 140 may adjust/convert the voltage of the source power SP into a certain voltage level to match the rated voltage of the load circuit 110 of the unmanned vehicle 100. The output terminal of the adaptive power supply 140 is coupled to the input power terminal of the load circuit 110 to power the load circuit 110. The present embodiment does not limit the implementation of the adaptive power supply 140. For example, in some embodiments, the adaptive power supply 140 may be an AC-to-DC converter or other power conversion circuits. In some other embodiments, the adaptive power supply 140 may be a DC-to-DC converter or other power conversion circuits. For example, depending on design requirements, the adaptive power supply 140 may be a switching regulator or other voltage stabilizing circuits.

The power supply device 20 may provide an AC high-voltage power (the source power SP, such as an AC voltage of 220 volts) to the unmanned vehicle 100 through the cable 10. As an example, the power and voltage required for the load circuit 110 of the unmanned vehicle 100 are respectively 600 watts and a DC voltage of 24 volts. The adaptive power supply 140 may adjust/convert the AC voltage of 220 volts of the source power SP into a DC voltage of 24 volts to power the load circuit 110. The length of the cable 10 may be determined based on design requirements. For example, the length of the cable 10 may be 100 meters, and assume that the resistance value of the parasitic resistance of 100 meters of the cable 10 is 15 ohms. Under the condition of not being powered by the battery 150, the current of the AC power transmitted by the cable 10 is 600/220≈2.73 amps, resulting in a voltage drop of 15*(600/220)≈40 volts for the cable 10. The wire loss of the cable 10 is [15*(600/220)]*(600/220)≈112 watts. In the present embodiment, the voltage of the source power SP is greater than the rated voltage of the load circuit 110, and the adaptive power supply 140 steps down the voltage level of the source power SP to meet the rated voltage of the load circuit 110. Therefore, the current value in the cable 10 may be lowered to effectively reduce the wire loss of the cable 10.

The battery 150 is coupled to the output terminal of the adaptive power supply 140. That is, the adaptive power supply 140 and the battery 150 are connected in parallel to the input power terminal of the load circuit 110. The battery 150 may be used as a buffered battery for the unmanned vehicle 100. In some scenarios, based on the control of the power dispatch controller 130, the battery 150 and the adaptive power supply 140 may optionally power the load circuit 110 together. When the power supply of the adaptive power supply 140 is abnormal, the battery 150 may provide power to the unmanned vehicle 100 to perform emergency processing (such as emergency landing, emergency stop, sending a distress signal, etc.)

The sensing circuit 120 is coupled to the output terminal of the adaptive power supply 140 to sense the output of the adaptive power supply 140. In some embodiments, the sensing circuit 120 is coupled to the battery 150 to sense the output of the battery 150. Based on design requirements, in some embodiments, the sensing circuit 120 is coupled to the input power terminal of the load circuit 110 to sense the input power of the load circuit 110. For example (but not limited to), the sensing circuit 120 includes a sensor 120a, a sensor 120b, and a sensor 120c. The sensor 120a is coupled to the output terminal of the adaptive power supply 140 to sense the output of the adaptive power supply 140. The sensor 120b is coupled to the battery 150 to sense the output of the battery 150. The sensor 120c is coupled to the input power terminal of the load circuit 110 to sense the input of the load circuit 110. Based on design requirements, the sensor 120a may include a voltage sensor, a current sensor, and/or other electrical sensors. The sensor 120a may sense an output voltage, an output current, a current direction, and/or other electrical characteristics of the adaptive power supply 140, and then provide a sensing result to the power dispatch controller 130. The sensor 120b may be analogized with reference to the description of the sensor 120a, and therefore is not repeated. The sensor 120c may include a voltage sensor, a current sensor, and/or other electrical sensors. The sensor 120c may sense an input voltage, an input current, a current direction, and/or other electrical characteristics of the load circuit 110, and then provide a sensing result to the power dispatch controller 130.

Figure 2:
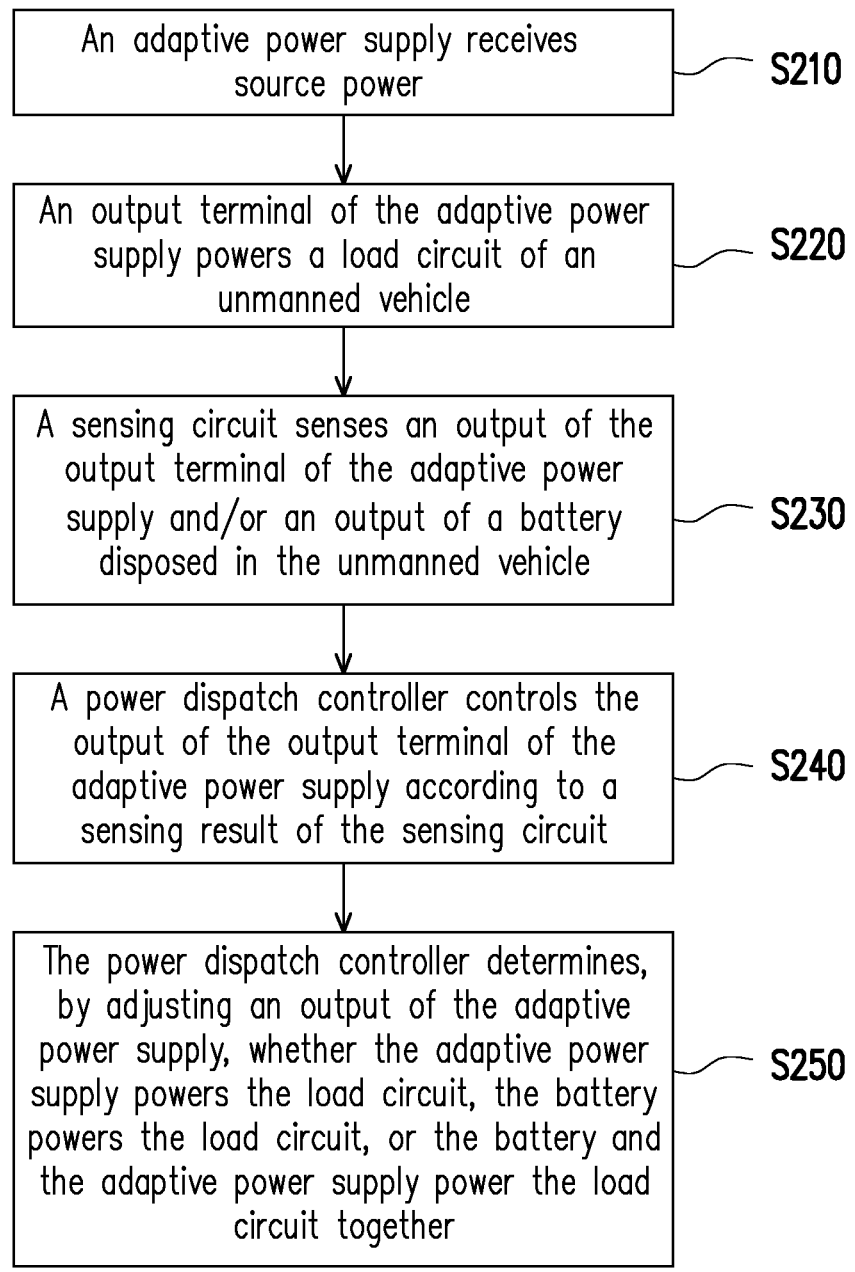
FIG. 2 is a flowchart of an operation method of an adaptive power supply system shown according to an embodiment of the disclosure.

FIG. 2 is a flowchart of an operation method of an adaptive power supply system shown according to an embodiment of the disclosure. Please refer to FIG. 1 and FIG. 2. The input terminal of the adaptive power supply 140 receives the source power SP (step S210), and the output terminal of the adaptive power supply 140 powers the load circuit 110 of the unmanned vehicle 100 (step S220). Based on design requirements, in step S230, the sensing circuit 120 may sense the output of the output terminal of the adaptive power supply 140, and/or the sensing circuit 120 may sense the output of the battery 150 disposed in the unmanned vehicle 100. In another embodiment, the sensing circuit 120 may sense the output of the adaptive power supply 140, the output of the battery 150, and/or the input power of the load circuit 110, depending on design requirements. For example, in some embodiments, the sensing circuit 120 may sense the output power (e.g., voltage, current, and/or other electrical characteristics) of the output terminal of the adaptive power supply 140 in step S230, but does not sense the output of the battery 150 and the input power of the load circuit 110, to obtain the sensing result. In some other embodiments, the sensing circuit 120 may sense the output of the output terminal of the adaptive power supply 140 and the output of the battery 150 in step S230, but does not sense the input power of the load circuit 110, to obtain the sensing result. In still some other embodiments, the sensing circuit 120 may sense the output of the output terminal of the adaptive power supply 140, the output of the battery 150, and the input power of the load circuit 110 in step S230 to obtain the sensing result.

The power dispatch controller 130 is coupled to the sensing circuit 120 to receive the sensing result of the sensing circuit 120. The power dispatch controller 130 is also coupled to the adaptive power supply 140. The sensing circuit 120 may provide a protection mechanism for overall power control. The power dispatch controller 130 may learn, through the sensing circuit 120, the voltage value, current value, current direction, and/or other electrical information of the output terminal of the adaptive power supply 140 and/or the voltage value, current value, current direction, and/or other electrical information of the battery 150. Based on the sensing result of the sensing circuit 120, the power dispatch controller 130 may control the output of the output terminal of the adaptive power supply 140 (step S240).

By adjusting the output of the adaptive power supply 140, the power dispatch controller 130 may determine whether the adaptive power supply 140 powers the load circuit 110, the battery 150 powers the load circuit 110, or the battery 150 and the adaptive power supply 140 power the load circuit 110 together (step S250). For example, the output voltage of the battery 150 is changed as the battery 150 is charged and discharged. When the battery 150 is discharged (e.g., to power the load circuit 110), the output voltage of the battery 150 is reduced, and therefore the power dispatch controller 130 may increase the output voltage of the adaptive power supply 140. When the output voltage of the adaptive power supply 140 is higher than the output voltage of the battery 150, the adaptive power supply 140 may power the load circuit 110 while charging the battery 150. The power dispatch controller 130 may monitor the voltage value, current value, and/or current direction of the adaptive power supply 140, the battery 150, and/or the load circuit 110 to dynamically adjust the output voltage of the adaptive power supply 140 such that the battery 150 may be charged or discharged.

Figure 3:
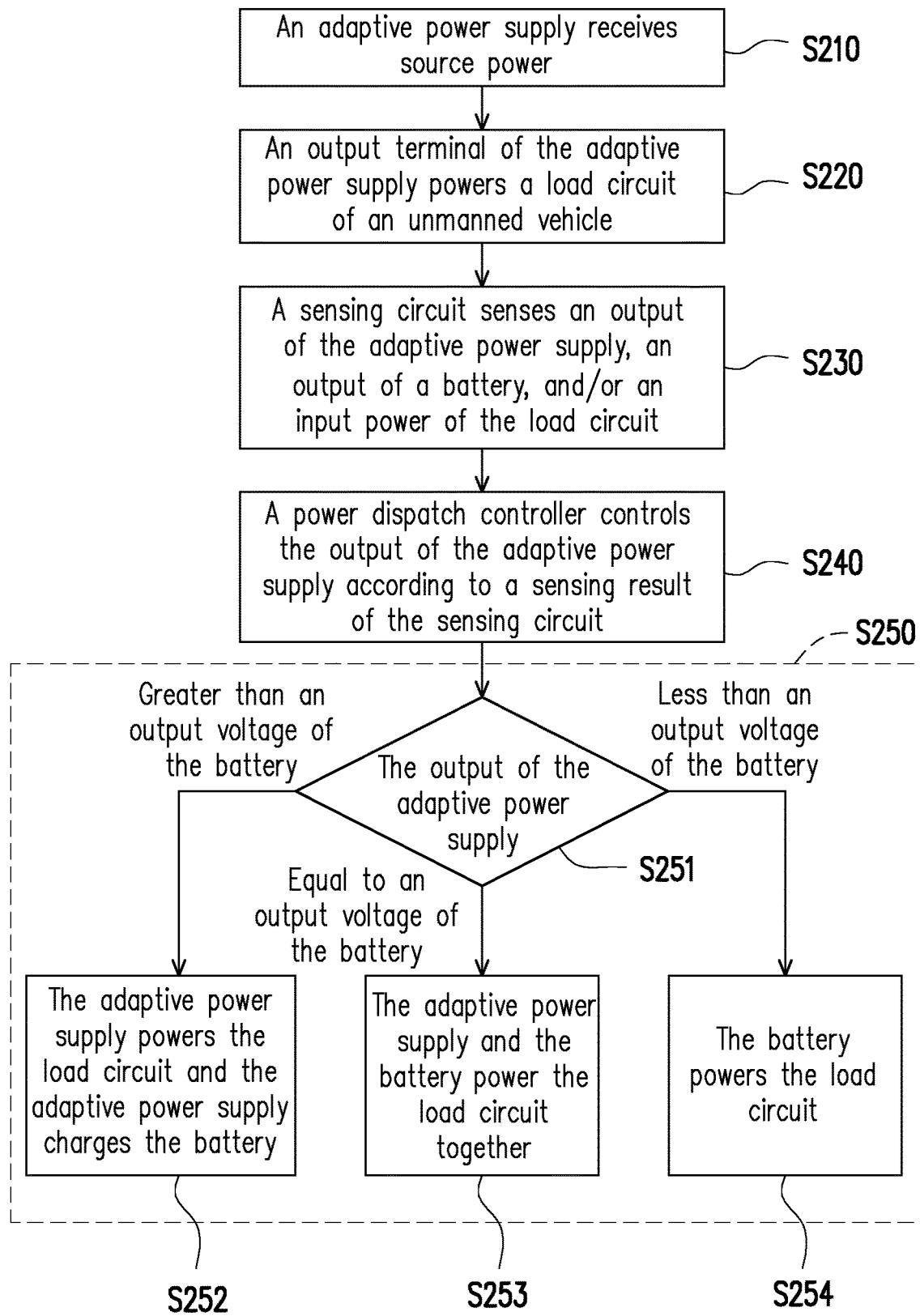
FIG. 3 is a flowchart of an operation method of an adaptive power supply system shown according to another embodiment of the disclosure.

FIG. 3 is a flowchart of an operation method of an adaptive power supply system shown according to another embodiment of the disclosure. Step S210 to step S250 shown in FIG. 3 are as described in FIG. 2 and are therefore not repeated. In the embodiment shown in FIG. 3, step S250 includes step S251, step S252, step S253, and step S254. Please refer to FIG. 1 and FIG. 3. In the present embodiment, the sensing circuit 120 senses the output voltage of the adaptive power supply 140 and the output voltage of the battery 150. Depending on the output voltage of the adaptive power supply 140 and the output voltage of the battery 150, the power dispatch controller 130 may determine whether one of the adaptive power supply 140 and the battery 150 powers the load circuit 110, or the battery 150 and the adaptive power supply 140 power the load circuit 110 together.

For example, the power dispatch controller 130 may increase the output voltage of the adaptive power supply 140 such that the output voltage of the adaptive power supply 140 is greater than the output voltage of the battery 150 (step S251 is "greater than the output voltage of the battery"). Thus, the adaptive power supply 140 may power the load circuit 110 and simultaneously charge the battery 150 (step S252). For example, when the power dispatch controller 130 learns that the output voltage of the battery 150 is too low (e.g., the output voltage of the battery 150 is below a certain threshold voltage), the power dispatch controller 130 may increase the output voltage of the adaptive power supply 140. When the output voltage of the adaptive power supply 140 is greater than the output voltage of the battery 150, the adaptive power supply 140 may power the load circuit 110 and charge the battery 150.

As another example, the power dispatch controller 130 may adjust the output voltage of the adaptive power supply 140 such that the output voltage of the adaptive power supply 140 is equal to the output voltage of the battery 150 (step S251 is "equal to the output voltage of the battery"). Therefore, the adaptive power supply 140 and the battery 150 may power the load circuit 110 together (step S253). When the power dispatch controller 130 learns that the load circuit 110 requires a large current (for example, through the sensing circuit 120 or the control system, software, or other circuits of the unmanned vehicle 100) and the power dispatch controller 130 is not ready to supply the large current immediately (or insufficient to supply the large current), the battery 150 may supply current to the load circuit 110 instantly (without switching) to meet the large current demand of the load circuit 110. That is, when the load circuit 110 requires a large current, the adaptive power supply 140 and the battery 150 may power the load circuit 110 together instantly (without switching). After the current demand of the load circuit 110 is reduced, the power dispatch controller 130 may increase the output voltage of the adaptive power supply 140 to charge the battery 150.

More specifically, the power dispatch controller 130 may reduce the output voltage of the adaptive power supply 140 such that the output voltage of the adaptive power supply 140 is lower than the output voltage of the battery 150 (step S251 is "less than the output voltage of the battery"). Therefore, the battery 150 may power the load circuit 110 (step S254).

The implementation of step S250 is not limited to FIG. 3. For example, in some other embodiments, the sensing circuit 120 may sense the output current of the output terminal of the adaptive power supply 140 and the output current of the battery 150. The power dispatch controller 130 may control/determine the output voltage of the adaptive power supply 140 based on the direction of the output current of the adaptive power supply 140 and the direction of the output current of the battery 150. In addition, the sensing circuit 120 may sense the input current of the input power of the load circuit 110. When the required input current of the load circuit 110 is greater than the rated values of the output current of the adaptive power supply 140 and the output current of the battery 150 (i.e., the adaptive power supply 140 and the battery 150 may not supply sufficient current to the load circuit 110), the power dispatch controller 130 may notify the power supply device 20 such that the power supply device 20 may provide a higher source power SP to the adaptive power supply 140 through the cable 10. The adaptive power supply 140 may output a greater current and power the load circuit 110 with the battery 150 together.

Based on design requirements, the adaptive power supply system shown in FIG. 1 may further include a tension control winch device. The tension control winch device retracts and releases the cable 10 and automatically control/adjust the tension of the cable 10. By adjusting the tension of the cable 10, the winding (knotting) of the cable 10 may be effectively avoided or reduced.

Figure 4:
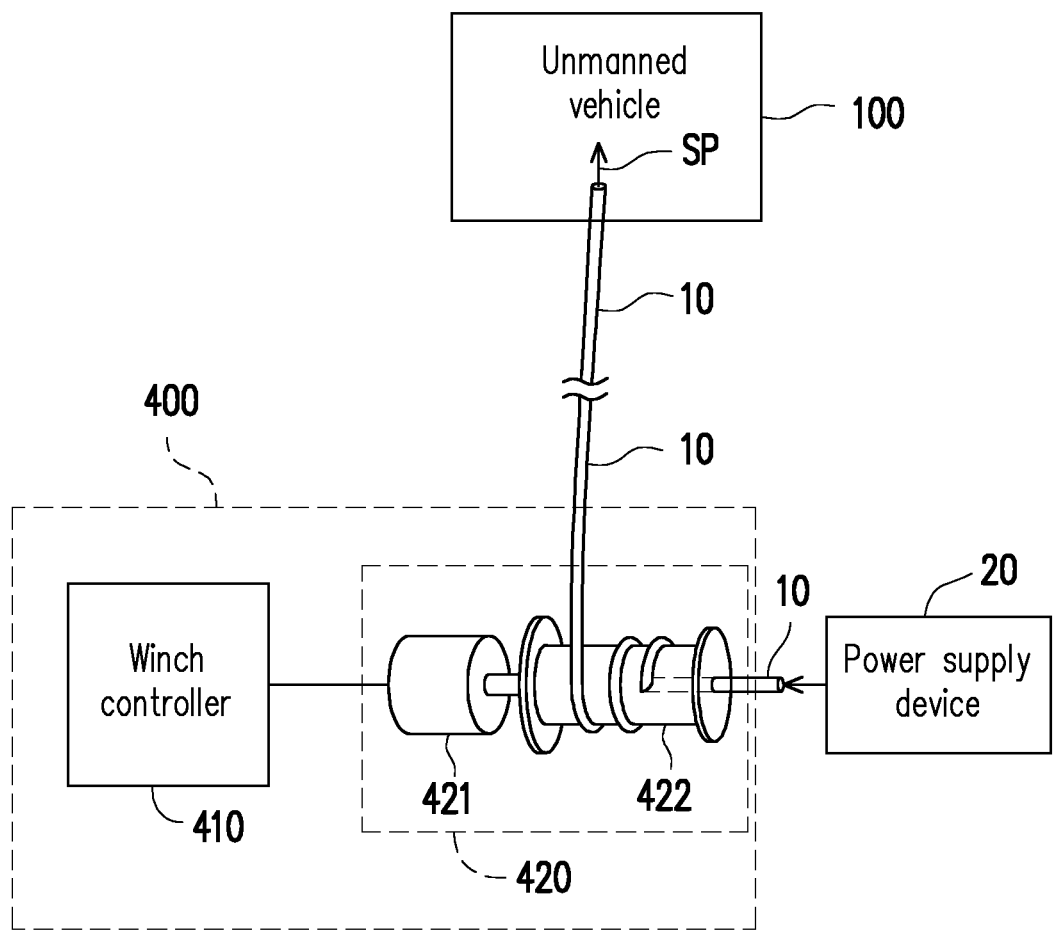
FIG. 4 is a circuit block diagram of a tension control winch device shown according to an embodiment of the disclosure.

For example, FIG. 4 is a circuit block diagram of a tension control winch device 400 shown according to an embodiment of the disclosure. The tension control winch device 400 shown in FIG. 4 is applicable to the unmanned vehicle 100. The tension control winch device 400 powers the unmanned vehicle 100 through the cable 10. The tension control winch device 400 includes a winch controller 410 and a winch module 420. The winch module 420 retracts and releases the cable 10, wherein the first end of the cable 10 is coupled to the unmanned vehicle 100, and the second end of the cable 10 is coupled to the power supply device 20. The power supply device 20 provides the source power SP to the unmanned vehicle 100 through the cable 10. The winch controller 410 is coupled to the winch module 420. The winch controller 410 correspondingly controls cable mode or speed of the winch module 420 for the cable 10 according to the tension of the cable 10 between the unmanned vehicle 100 and the winch module 420 to automatically adjust the tension of the cable 10.

Figure 5:
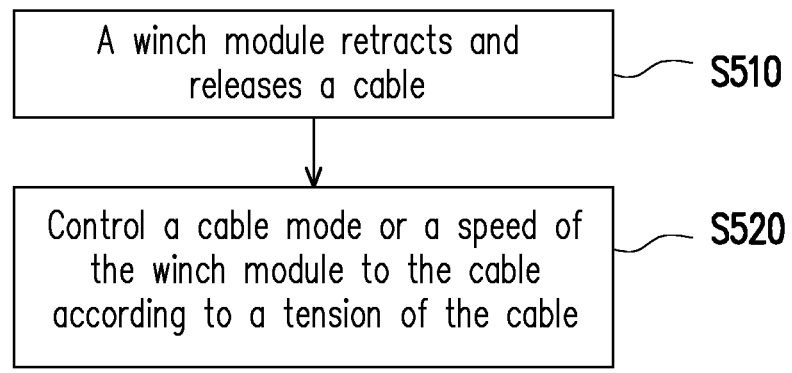
FIG. 5 is a flowchart of an operation method of a tension control winch device shown according to an embodiment of the disclosure.

FIG. 5 is a flowchart of an operation method of a tension control winch device shown according to an embodiment of the disclosure. Please refer to FIG. 4 and FIG. 5. In step S510, the cable 10 is retracted and released by the winch module 420. According to the tension of the cable 10 between the unmanned vehicle 100 and the winch module 420, in step S520, the winch controller 410 correspondingly controls the cable mode or the speed of the winch module 420 for the cable 10 to automatically adjust the tension of the cable 10.

In the embodiment shown in FIG. 4, the winch module 420 may include a motor 421 and a winch 422. The motor 421 may drive the winch 422 to rotate, such that the cable 10 may be wound on the winch 422. Based on design requirements, the motor 421 may be any type of motor, such as a DC motor, a stepper motor, or other types of motor. The winch controller 410 may learn the load condition of the motor 421 and infer the tension of the cable 10 according to the load condition. Based on design requirements, the winch controller 410 may pre-define the tension upper limit and/or the tension lower limit. The winch controller 410 may control the cable mode or the speed of the motor 421 for the cable 10 based on the tension and the tension upper limit (and/or the tension lower limit) of the cable 10.

For example, when the tension of the cable 10 is greater than the tension upper limit, the winch controller 410 may control the motor 421 and the winch 422 to enter a release mode to reduce the tension of the cable 10. When the tension of the cable 10 is less than the tension lower limit, the winch controller 410 may control the motor 421 and the winch 422 to enter a retract mode to increase the tension of the cable 10. When the tension of the cable 10 is between the tension upper limit and the tension lower limit, the winch controller 410 may control the motor 421 to enter a stop mode to stop the rotation of the winch 422. The tension upper limit and the tension lower limit may be determined based on design requirements.

As another example, when the tension of the cable 10 is greater than the tension upper limit, the winch controller 410 may control the rotational speed of the motor 421 such that the speed of the winch 422 is negative (i.e., release) to reduce the tension of the cable 10. When the tension of the cable 10 is less than the tension lower limit, the winch controller 410 may control the rotational speed of the motor 421 such that the speed of the winch 422 is positive (i.e., retraction) in order to increase the tension of the cable 10. When the tension of the cable 10 is between the tension upper limit and the tension lower limit, the winch controller 410 may control the rotational speed of the motor 421 such that the speed of the winch 422 is zero (i.e., cable is stopped).

Figure 6:
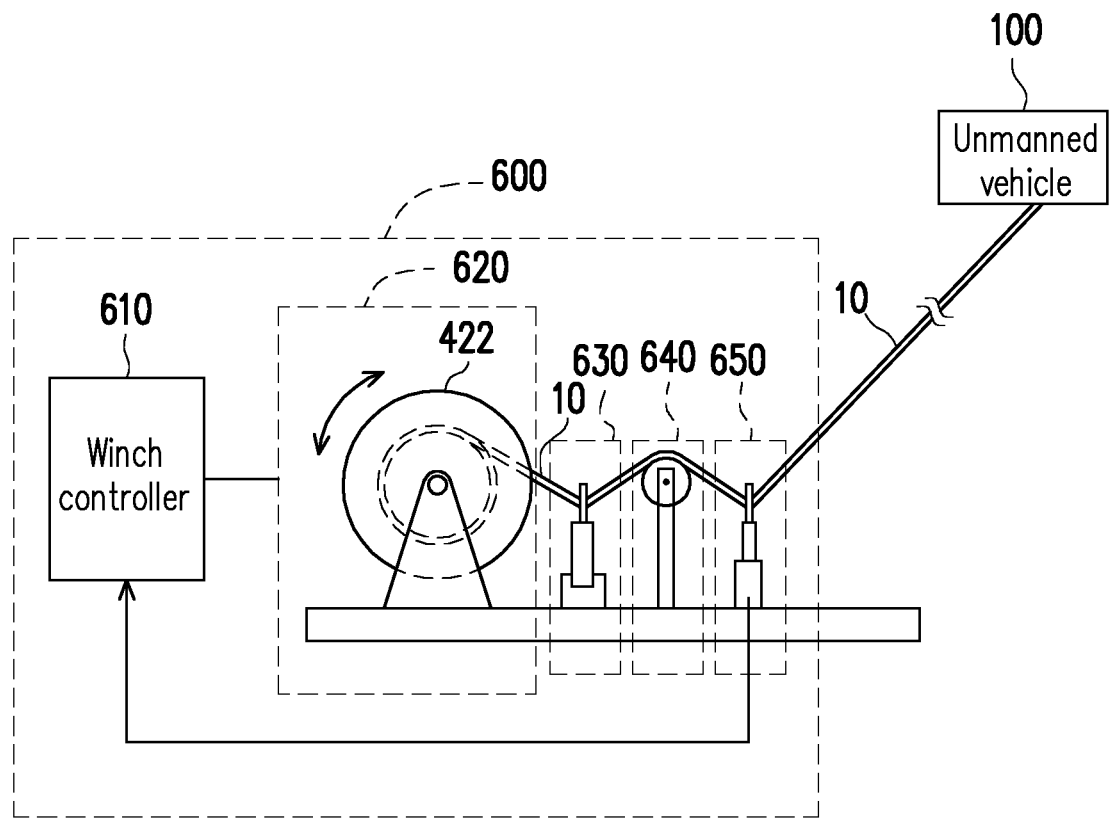
FIG. 6 is a circuit block diagram of a tension control winch device shown according to another embodiment of the disclosure.

FIG. 6 is a circuit block diagram of a tension control winch device 600 shown according to another embodiment of the disclosure. FIG. 6 is a side view of the tension control winch device 600. In the embodiment shown in FIG. 6, the tension control winch device 600 shown in FIG. 6 includes a winch controller 610, a winch module 620, a wire-trimming mechanism 630, a wheel 640, and a tension sensor 650. The tension control winch device 600, the winch controller 610, and the winch module 620 shown in FIG. 6 may be analogized with reference to the descriptions of the tension control winch device 400, the winch controller 410, and the winch module 420 shown in FIG. 4, and therefore are not repeated. It should be noted that one or more of the wire-trimming mechanism 630, the wheel 640, and the tension sensor 650 may be omitted in other embodiments based on design requirements.

Figure 7:
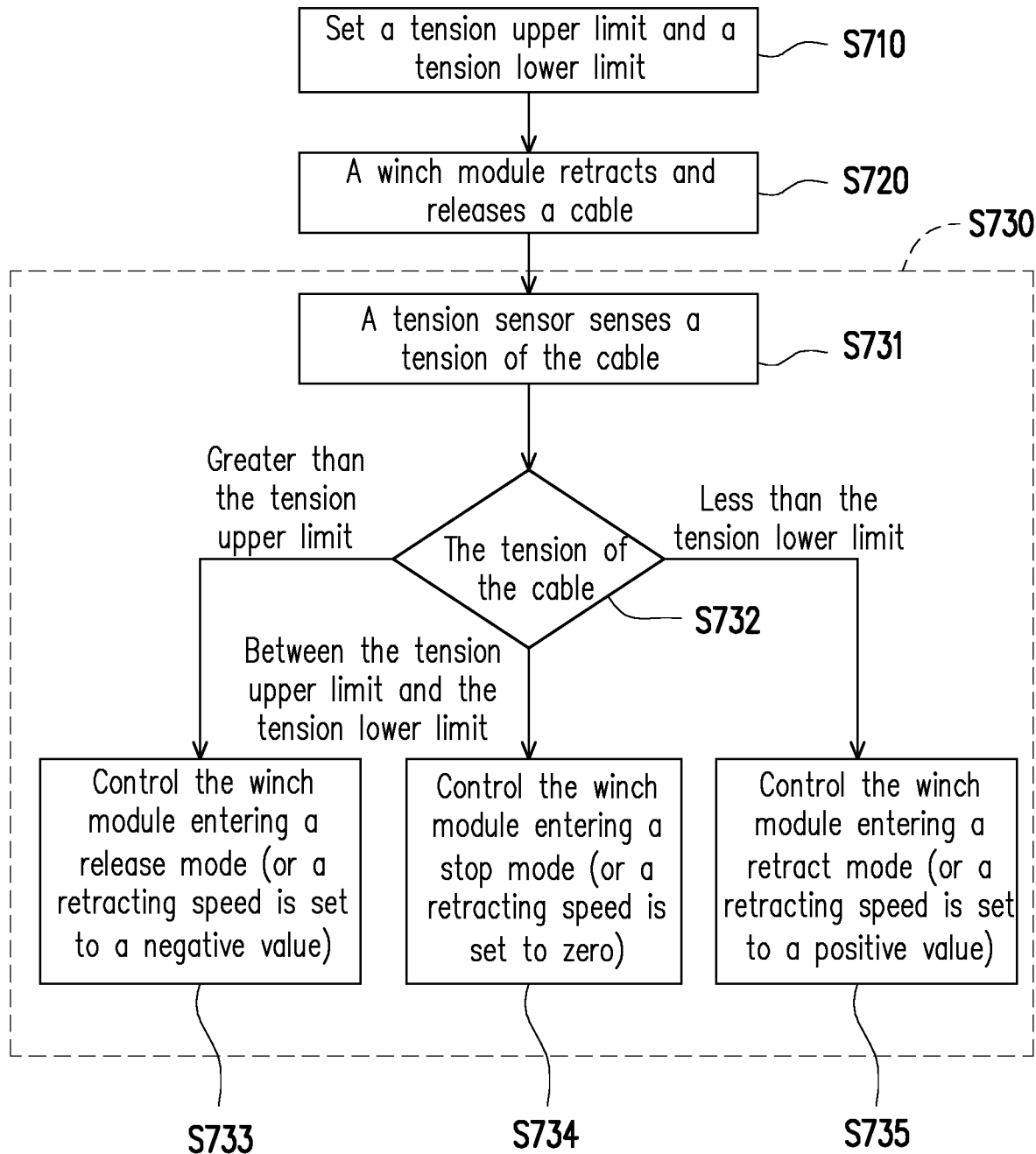
FIG. 7 is a flowchart of an operation method of a tension control winch device shown according to another embodiment of the disclosure.

FIG. 7 is a flowchart of an operation method of a tension control winch device shown according to another embodiment of the disclosure. Please refer to FIG. 4, FIG. 5, and FIG. 6. The tension sensor 650 is coupled to the winch controller 610. The tension sensor 650 senses the tension of the cable 10 between the unmanned vehicle 100 and the winch module 620 and generates a tension value associated with the tension to the winch controller 610. In step S710, the winch controller 610 may preset the tension upper limit and/or the tension lower limit.

Step S720 and step S730 shown in FIG. 7 are as described in step S510 and step S520 shown in FIG. 5. Based on the control of the winch controller 610, the winch module 620 retracts and releases the cable 10 (step S720). Based on the tension value provided by the tension sensor 650 and the tension upper limit (and/or the tension lower limit) set in step S710, the winch controller 610 controls cable mode or speed of the winch module 620 for the cable 10 (step S730).

In the embodiment shown in FIG. 7, step S730 includes step S731, step S732, step S733, step S734, and step S735. In step S731, the tension sensor 650 may sense the tension of the cable 10 between the unmanned vehicle 100 and the winch module 620 and generates a tension value associated with the tension to the winch controller 610. In step S732 to step S735, the winch controller 610 controls the cable mode or the speed of the winch module 620 for the cable 10 based on the tension value and the tension upper limit (and/or the tension lower limit). The tension upper limit and the tension lower limit may be determined based on design requirements.

When the tension of the cable 10 is greater than the tension upper limit (step S732 is "greater than the tension upper limit"), the winch controller 610 may control the winch module 620 to enter release mode (step S733) to reduce the tension of the cable 10. In another embodiment, the winch controller 610 may control the speed of the winch module 620 (rotational speed of the winch 422) in step S733 such that the retracting speed of the winch 422 is negative (i.e., release), so as to reduce the tension of the cable 10.

When the tension of the cable 10 is between the tension upper limit and the tension lower limit (step S732 is "between the tension upper limit and the tension lower limit"), the winch controller 610 may control the winch module 620 to enter stop mode (step S734) to stop the rotation of the winch 422. In another embodiment, the winch controller 610 may control the speed of the winch module 620 (rotational speed of the winch 422) in step S734 such that the retracting speed of the winch 422 is zero (i.e., cable is stopped).

When the tension of the cable 10 is less than the tension lower limit (step S732 is "less than the tension lower limit"), the winch controller 610 may control the winch module 620 to enter retract mode (step S735) to increase the tension of the cable 10. In another embodiment, the winch controller 610 may control the speed of the winch module 620 (rotational speed of the winch 422) in step S735 such that the retracting speed of the winch 422 is positive (i.e., retraction) so as to increase the tension of the cable 10.

In some embodiments, the operation method further includes: dynamically adjusting the retracting position of the cable 10 in the winch 422 by the wire-trimming mechanism 630 during the retraction of the cable 10 by the winch module 620 according to the number of revolutions of the winch 422 of the winch module 620.

Figure 8:
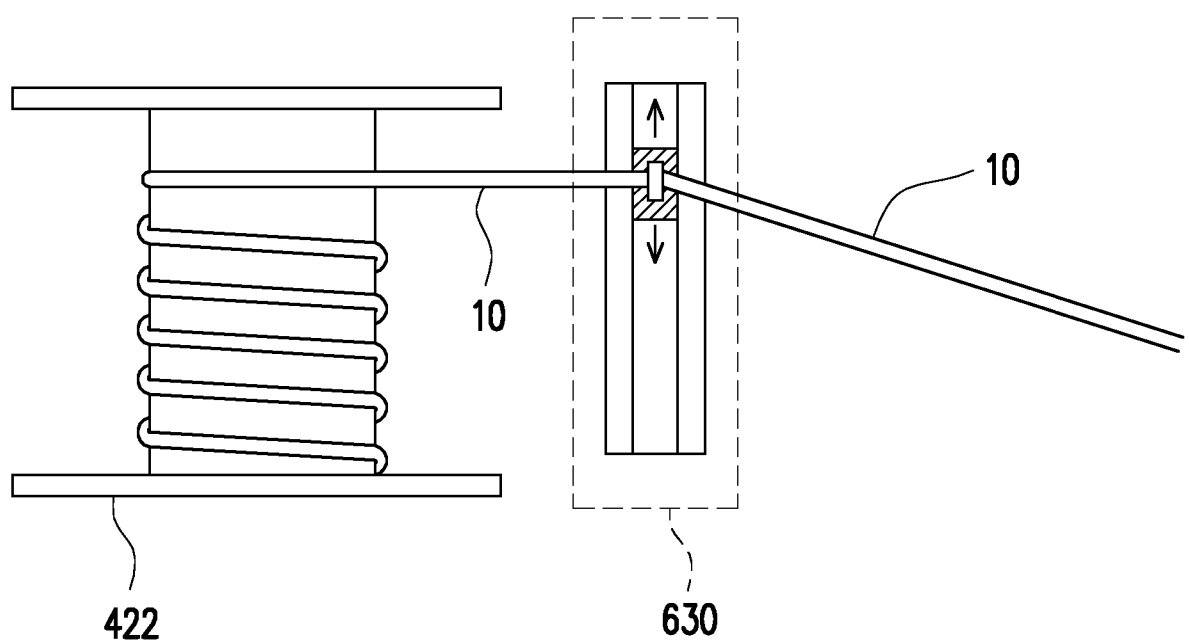
FIG. 8 is a top view of the winch and the wire-trimming mechanism of FIG. 6 shown according to an embodiment of the disclosure.

FIG. 8 is a top view of the winch 422 and the wire-trimming mechanism 630 of FIG. 6 shown according to an embodiment of the disclosure. The wire-trimming mechanism 630 may drive the cable 10 to move (for example, moving along the direction of the arrow shown in FIG. 8). During the retraction of the cable 10 by the winch 422 of the winch module 620, the wire-trimming mechanism 630 may dynamically adjust the retracting position of the cable 10 in the winch 422 according to the number of revolutions of the winch 422. As such, the cable 10 may be evenly dispersed on the winch 422.

Based on the above, a tension control winch device is applicable to an unmanned vehicle, and the tension control winch device includes a winch module and a winch controller. The winch module retracts and releases a cable, wherein a first end of the cable is coupled to the unmanned vehicle, a second end of the cable is coupled to a power supply device, and the power supply device provides source power to the unmanned vehicle through the cable. The winch controller is coupled to the winch module, wherein the winch controller correspondingly controls cable mode or speed of the winch module for the cable according to a tension of the cable between the unmanned vehicle and the winch module to automatically adjust the tension of the cable.

In some embodiments, the tension control winch device further includes a tension sensor. The tension sensor is coupled to the winch controller to sense the tension of the cable between the unmanned vehicle and the winch module and generate a tension value associated with the tension to the winch controller.

In some embodiments, the winch controller controls cable mode or speed of the winch module to the cable according to the tension value and according to a tension upper limit or a tension lower limit.

In some embodiments, the tension control winch device further includes a wire-trimming mechanism. A wire-trimming mechanism dynamically adjusts a retracting position of the cable in the winch according to a number of revolutions of a winch of the winch module during the retraction of the cable by the winch module.

Based on the above, the operation method of the tension control winch device is applicable to an unmanned vehicle. The operation method includes: retracting and releasing a cable by a winch module, wherein the first end of the cable is coupled to the unmanned vehicle, the second end of the cable is coupled to the power supply device, and the power supply device provides source power to the unmanned vehicle through the cable; and correspondingly controlling, by the winch controller, the cable mode or the speed of the winch module for the cable according to the tension of the cable between the unmanned vehicle and the winch module to automatically adjust the tension of the cable.

In some embodiments, the operation method further includes: sensing, by the tension sensor, the tension of the cable between the unmanned vehicle and the winch module; and generating, by the tension sensor, a tension value associated with the tension to the winch controller.

In some embodiments, the step of correspondingly controlling the cable mode or the speed of the winch module for the cable includes: controlling, by the winch controller, the cable mode or the speed of the winch module to the cable according to the tension value and according to the tension upper limit or the tension lower limit.

In some embodiments, the operation method further includes: dynamically adjusting the retracting position of the cable in the winch by the wire-trimming mechanism during the retraction of the cable by the winch module according to the number of revolutions of the winch of the winch module.

According to different design requirements, the blocks of the power dispatch controller 130 and/or the winch controller 610 may be implemented in the form of hardware, firmware, software (i.e., program), or a combination of a plurality of the three.

In hardware form, the blocks of the power dispatch controller 130 and/or the winch controller 610 may be implemented in a logic circuit on an integrated circuit. The related functions of the power dispatch controller 130 and/or the winch controller 610 may be implemented as hardware using a hardware description language such as Verilog HDL or VHDL or other suitable programming languages. For example, the related functions of the power dispatch controller 130 and/or the winch controller 610 may be implemented in one or more controllers, microcontrollers, microprocessors, application-specific integrated circuits (ASICs), digital signal processors (DSPs), field-programmable gate arrays (FPGAs), and/or various logic blocks, modules, and circuits in other processing units.

In software form and/or firmware form, the related functions of the power dispatch controller 130 and/or the winch controller 610 may be implemented as programming codes. For example, the power dispatch controller 130 and/or the winch controller 610 may be implemented using a general programming language (such as C, C++, or a combination language) or other suitable programming languages. The programming codes may be recorded/stored in a recording medium, and the recording medium includes, for example, a read-only memory (ROM), a storage device, and/or a random-access memory (RAM). A computer, a central processing unit (CPU), a controller, a microcontroller, or a microprocessor may read and execute the programming codes from the recording medium to achieve a related function. For the recording medium, a "non-transitory computer-readable medium" may be used. For example, a tape, a disk, a card, a semiconductor memory, a programmable logic circuit, etc. may be used. Moreover, the program may also be provided to the computer (or CPU) through any transmission medium (communication network or broadcast wave, etc.) The communication network is, for example, the internet, wired communication, wireless communication, or other communication media.

Based on the above, the adaptive power supply and battery described in the embodiments of the disclosure are disposed in an unmanned vehicle. The adaptive power supply may adjust/convert the voltage of the source power into a voltage level that matches the rated voltage of the load circuit of the unmanned vehicle. Therefore, the current value in the cable may be reduced as much as possible to effectively reduce the wire loss of the cable. Furthermore, when the load circuit requires a large current instantaneously, the adaptive power supply and the battery may power the load circuit together instantly (without switching).

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An adaptive power supply system for an unmanned vehicle, the adaptive power supply system comprising:
   an adaptive power supply, disposed in the unmanned vehicle, configured to receive source power, wherein an output terminal of the adaptive power supply is configured to power a load circuit of the unmanned vehicle;
   a battery, disposed in the unmanned vehicle and coupled to the output terminal of the adaptive power supply;
   a sensing circuit, coupled to the output terminal of the adaptive power supply to sense an output of the adaptive power supply, and coupled to the battery to sense an output of the battery; and
   a power dispatch controller coupled to the sensing circuit and the adaptive power supply, wherein the power dispatch controller is configured to control the output of the output terminal of the adaptive power supply according to a sensing result of the sensing circuit, and is configured to determine, by adjusting the output of the adaptive power supply, whether the adaptive power supply powers the load circuit, the battery powers the load circuit, or the battery and the adaptive power supply power the load circuit together.

2. The adaptive power supply system of claim 1, wherein the sensing circuit is further coupled to the load circuit to sense an input power of the load circuit.

3. The adaptive power supply system of claim 1, wherein a voltage of the source power is greater than a rated voltage of the load circuit, and the adaptive power supply steps down the voltage of the source power to a voltage level that matches the rated voltage of the load circuit.

4. The adaptive power supply system of claim 1, wherein the sensing circuit senses an output voltage of the adaptive power supply and an output voltage of the battery, and the power dispatch controller determines, according to the output voltage of the adaptive power supply and the output voltage of the battery, whether one of the adaptive power supply and the battery powers the load circuit, or the battery and the adaptive power supply power the load circuit together.

5. The adaptive power supply system of claim 4, wherein the power dispatch controller adjusts the output voltage of the adaptive power supply to be greater than the output voltage of the battery such that the adaptive power supply powers the load circuit and the adaptive power supply charges the battery.

6. The adaptive power supply system of claim 4, wherein the power dispatch controller adjusts the output voltage of the adaptive power supply to be equal to the output voltage of the battery such that the adaptive power supply and the battery power the load circuit together.

7. The adaptive power supply system of claim 4, wherein the power dispatch controller adjusts the output voltage of the adaptive power supply to be less than the output voltage of the battery such that the battery powers the load circuit.

8. The adaptive power supply system of claim 1, wherein the sensing circuit senses an output current of the adaptive power supply and an output current of the battery, and the power dispatch controller determines an output voltage of the adaptive power supply according to a direction of the output current of the adaptive power supply and a direction of the output current of the battery.

9. The adaptive power supply system of claim 1, further comprising:
   a tension control winch device to retract and release a cable,
   wherein an input terminal of the adaptive power supply is coupled to a first end of the cable to receive the source power.

10. The adaptive power supply system of claim 9, wherein the tension control winch device comprises:
    a winch module, configured to retract and release the cable, wherein a second end of the cable is coupled to a power supply device to provide the source power; and
    a winch controller coupled to the winch module, wherein the winch controller is configured to correspondingly control a cable mode or a speed of the winch module for the cable according to a tension of the cable between the unmanned vehicle and the winch module to automatically adjust the tension of the cable.

11. The adaptive power supply system of claim 10, wherein the tension control winch device further comprises:
    a tension sensor coupled to the winch controller to sense the tension of the cable between the unmanned vehicle and the winch module and generate a tension value associated with the tension to the winch controller.

12. The adaptive power supply system of claim 11, wherein the winch controller controls the cable mode or the speed of the winch module for the cable according to the tension value and a tension upper limit or a tension lower limit.

13. The adaptive power supply system of claim 10, wherein the tension control winch device further comprises:
    a wire-trimming mechanism, configured to dynamically adjusting a retracting position of the cable in a winch of the winch module according to a number of revolutions of the winch during a retraction of the cable by the winch module.

14. An operation method of an adaptive power supply system for an unmanned vehicle, the operation method comprising:
receiving source power by an adaptive power supply disposed in the unmanned vehicle;
powering a load circuit of the unmanned vehicle by an output terminal of the adaptive power supply;
sensing an output of the output terminal of the adaptive power supply by a sensing circuit;
detecting an output of a battery disposed in the unmanned vehicle by the sensing circuit, wherein the battery is coupled to the output terminal of the adaptive power supply; and
controlling the output of the output terminal of the adaptive power supply by a power dispatch controller according to a sensing result of the sensing circuit, wherein the power dispatch controller determines, by adjusting the output of the adaptive power supply, whether the adaptive power supply powers the load circuit, the battery powers the load circuit, or the battery and the adaptive power supply power the load circuit together.

15. The operation method of claim 14, further comprising:
sensing an input power of the load circuit by the sensing circuit.

16. The operation method of claim 14, wherein a voltage of the source power is greater than a rated voltage of the load circuit, and the step of powering the load circuit by the output terminal of the adaptive power supply comprises:
stepping down a voltage of the source power by the adaptive power supply to a voltage level that matches the rated voltage of the load circuit.

17. The operation method of claim 14, wherein the sensing circuit senses an output voltage of the adaptive power supply and an output voltage of the battery, and the operation method further comprises:
determining, according to the output voltage of the adaptive power supply and the output voltage of the battery, whether one of the adaptive power supply and the battery powers the load circuit, or the battery and the adaptive power supply power the load circuit together.

18. The operation method of claim 17, further comprising:
adjusting the output voltage of the adaptive power supply to be greater than the output voltage of the battery such that the adaptive power supply powers the load circuit and the adaptive power supply charges the battery.

19. The operation method of claim 17, further comprising:
adjusting the output voltage of the adaptive power supply to be equal to the output voltage of the battery such that the adaptive power supply and the battery power the load circuit together.

20. The operation method of claim 17, further comprising:
adjusting the output voltage of the adaptive power supply to be less than the output voltage of the battery such that the battery powers the load circuit.

21. The operation method of claim 14, further comprising:
sensing an output current of the adaptive power supply and an output current of the battery; and
determining an output voltage of the adaptive power supply according to a direction of the output current of the adaptive power supply and a direction of the output current of the battery.

22. The operation method of claim 14, further comprising:
retracting and releasing a cable by a tension control winch device,
wherein an input terminal of the adaptive power supply is coupled to a first end of the cable to receive the source power.

23. The operation method of claim 22, wherein the step of retracting and releasing the cable by the tension control winch device comprises:
retracting and releasing the cable by a winch module, wherein a second end of the cable is coupled to a power supply device to provide the source power; and
correspondingly controlling a cable mode or a speed of the winch module to the cable by a winch controller according to a tension of the cable between the unmanned vehicle and the winch module to automatically adjust the tension of the cable.

24. The operation method of claim 23, wherein the step of retracting and releasing the cable by the tension control winch device further comprises:
sensing the tension of the cable between the unmanned vehicle and the winch module by a tension sensor; and
generating a tension value associated with the tension by the tension sensor to the winch controller.

25. The operation method of claim 24, wherein the step of retracting and releasing the cable by the tension control winch device further comprises:
controlling the cable mode or the speed of the winch module for the cable by the winch controller according to the tension value and a tension upper limit or a tension lower limit.

26. The operation method of claim 23, wherein the step of retracting and releasing the cable by the tension control winch device further comprises:
dynamically adjusting a retracting position of the cable in a winch of the winch module by a wire-trimming mechanism according to a number of revolutions of the winch during a retraction of the cable by the winch module.

* * * * *